Oct. 13, 1953
J. E. GORDON ET AL
2,655,459
METHOD OF PRODUCING AN AEROFOIL HAVING
A CORE AND A LAMINATED MOLDED SKIN
Filed May 31, 1949
2 Sheets-Sheet 1
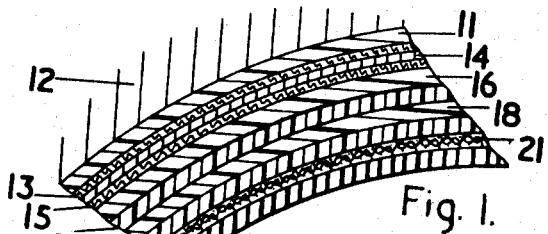
Fig. 1.
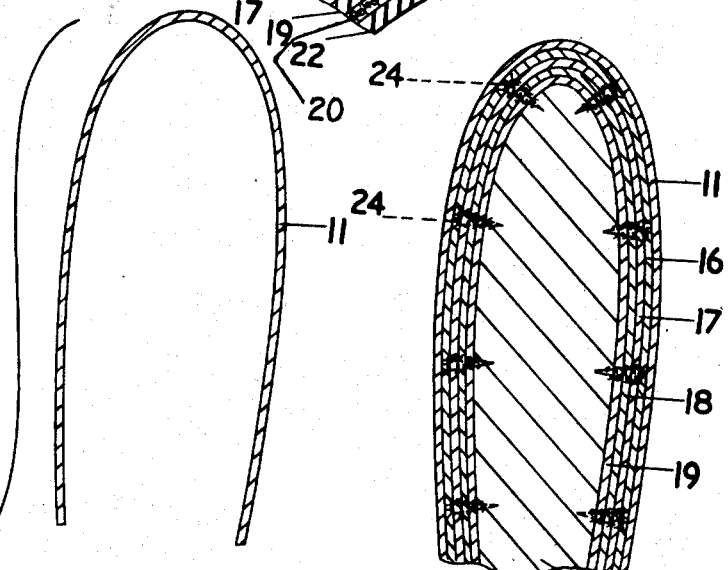
Fig. 2.
Fig. 3.
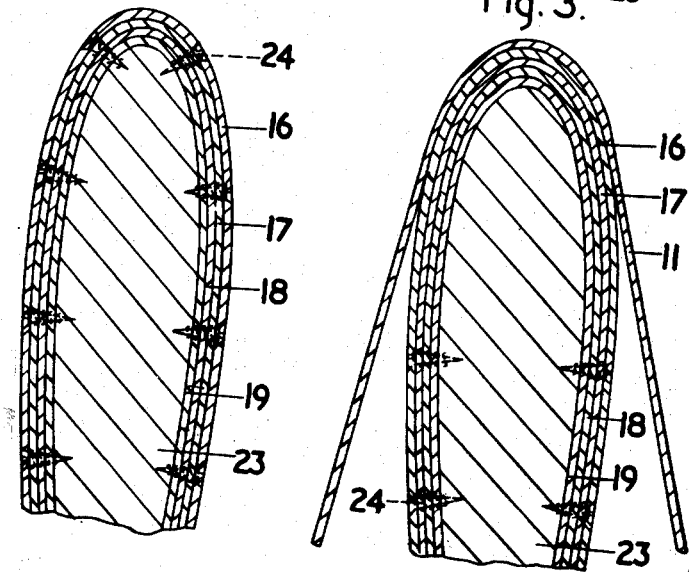
Fig. 4.
Inventor
J. E. Gordon
C. G. Evans
By
Attorneys Oct. 13, 1953     J. E. GORDON ET AL     2,655,459
METHOD OF PRODUCING AN AEROFOIL HAVING
A CORE AND A LAMINATED MOLDED SKIN Filed May 31, 1949     2 Sheets-Sheet 2

J. E. Gordon
C. G. Evans
Inventors

Attorneys

Patented Oct. 13, 1953

2,655,459

UNITED STATES PATENT OFFICE 2,655,459

METHOD OF PRODUCING AN AEROFOIL HAVING A CORE AND A LAMINATED MOLDED SKIN

James E. Gordon, Rollright, Fleet, and Cyril G. Evans, Farnborough, England, assignors to the Minister of Supply in His Majesty's Government of the United Kingdom of Great Britain and Northern Ireland, London, England Application May 31, 1949, Serial No. 96,234
In Great Britain June 11, 1948

8 Claims. (Cl. 154—110)

This invention relates to the production of articles having skins of moulded material, for example of moulded plastic material such as thermo-setting synthetic resinous products.

Where re-inforcing, space-dividing and other internal members are secured to a skin by screws, nails or equivalent fixing members, it is desirable that the screws or the like shall not extend to the outer surface of the skin; this is more particularly the case in connection with aerofoil structures and other aircraft parts where the outer surface of the skin is exposed to the air-flow.

In accordance with the present invention, a laminated skin is so moulded that an outer portion thereof is divided from the remainder by a plane of weakness; after the moulding operation, the outer portion is separated from the remainder portion and is finally fixed in position covering any screws, nails or other fixing members which have been inserted.

The moulding together and subsequent separation of the inner and outer skin portions ensures that the adjacent surfaces of the two portions will fit adequately together and this result may be achieved when using any convenient method of moulding. To attempt to achieve a similar fit by moulding the inner and outer portions separately would not only be extremely difficult but would also be costly in view of the very high degree of accuracy which would be required of the separate moulds employed to produce the mating surfaces of the two portions.

An example of the application of the invention to the production of an aerofoil comprising a moulded skin secured to wooden ribs is illustrated by the accompanying drawings, in which:

Figure 1 represents a section through part of the requisite materials and accessories assembled in a mould for the first step in the production of the nose portion of an aerofoil.

Figure 2 represents, in section and to a smaller scale, the materials involved in the step following the moulding operation. In this and succeeding figures, crosshatching is omitted in the interests of clarity.

Figure 3 is a representation in section, similar to that of Figure 2, of the completed nose portion.

Figure 4 is a sectional representation, equivalent to that of Figure 2, of the second step in an alternative method of production

Figure 5:
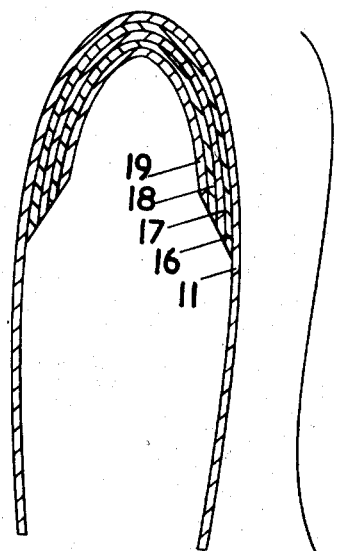
Figure 5 is a sectional representation, equivalent to those of Figures 2 and 4, of the second step of a third method.
Figure 5:
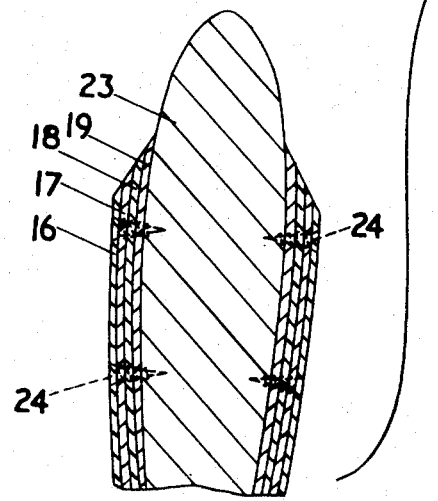

In the first step, illustrated by Figure 1, a layer 11 of curable synthetic resinous material is positioned in a mould 12 of the requisite shape and is followed by a thin layer 13 of glass fibre cloth, a layer 14 of regenerated cellulose and a further layer 15 of glass fibre cloth, after which sufficient further layers of curable synthetic resinous material are placed in position to make up the required skin thickness, four such layers being indicated in the drawing by the references 16, 17, 18 and 19. A porous mat 20 of glass fibre cloth, in which an electrical resistance network 21 is embedded, is placed in contact with the last layer 19 of the curable synthetic resinous material and is followed by a rubber bag 22. The resinous material is cured by the application of heat from the resistance network and from any electrical or other heating means (not shown) provided in the mould itself, the material being pressed against the moulding surface by the differential pressure produced by the evacuation of the rubber bag by means of a vacuum pump or the like. The evacuation of the bag and the removal of the gases evolved during curing are facilitated by the presence of the porous mat, the layers 13, 14 and 15 of glass fibre cloth and cellulose offering no substantial resistance to the passage of gases from the layer 11.

The presence of the parting layers 13 and 15 of glass fibre cloth and the layer 14 of regenerated cellulose prevents adhesion of the outer layer 11 of curable synthetic resinous material during curing and, after removal from the mould, this layer may be separated from the rest of the moulded skin as illustrated by Figure 2. This figure also shows a wooden rib 23 set up in position and secured by screws 24 passing through countersunk holes drilled in the main portion of the moulded skin. Finally, any traces of glass fibre cloth having been removed from the outer surface of the main skin moulding and the inner surface of the outer layer, the outer layer 11 is replaced in position, as shown by Figure 3, and glued to the main moulding.

In cases in which it is unnecessary to separate the whole of the outer layer from the main portion of the skin moulding, parting agent or agents may be provided only between those parts of the outer layer and of the main portion which it is necessary to separate for the purpose of inserting the screws or the like. In the case, for example, of a substantially U-shaped molding for the forward portion of the skin of an aerofoil, it may be necessary only to provide planes of weakness in the limb-portions of the U, the leading edcuring process and being undisturbed when the rearward portions of the upper and lower layers are flexed away from the remainder, as represented in Figure 4, to permit insertion of the screws or the like. According to the alternative method illustrated by Figure 5, planes of weakness are so produced in the moulding stage that the whole of the leading edge portion of the aerofoil is not only formed integrally with the outer skin layer but comes away with it when it is separated from the remainder of the moulding: this procedure is preferable to that illustrated by Figure 4 when it is required to insert screws or the like near the leading edge of the aerofoil.

If desired, the use alone of pre-formed solid sheets of parting agent in the production of planes of weakness may be replaced by the use, alone or in conjunction with a solid sheet of glass fibre cloth or the like, of an easily removable parting agent which is sprayed on to the faces of the uncured material which are to form the outer surface of the outer skin layer and the inner surface of the main skin moulding. Thus, a water-soluble parting agent such as methyl cellulose may be sprayed onto resinated asbestos material before the latter is positioned in the mould, the parting agent being washed off the faces after curing and before final gluing, unless compatible with the particular glue to be used.

We claim:

1. A method of producing with a continuous external surface an article having an inner structure and a laminated skin of moulded synthetic resinous material secured to said inner structure by securing members which extend through the skin into the inner structure, according to which a parting agent is interposed between an outer lamination and a next adjacent inner lamination of the skin, the skin is then moulded to shape, said outer lamination is displaced from said inner lamination where the parting agent is interposed between them, the skin is secured to an inner structure by passing securing members through said inner but not said outer lamination into said inner structure and said outer lamination is replaced to said inner lamination and caused to adhere thereto.

2. A method of producing with a continuous external surface an aerofoil or other article having a core and a laminated skin of moulded synthetic resinous material secured to said core by securing members which extend through the skin into said core, according to which a parting agent is interposed between an outer lamination and a next adjacent inner lamination of the skin being sufficiently thin and of such a nature that the inner surface of the outer lamination will be substantially of the same shape and configuration as the outer surface of the inner lamination, the skin is then moulded to shape, said outer lamination is displaced from said inner lamination where the parting agent is interposed between them, the skin is secured to a core by passing securing members through said inner but not said outer lamination into the core, and said outer lamination is replaced to said inner lamination and caused to adhere thereto.

3. A method as claimed in claim 1 wherein the parting agent is interposed between said outer and said next adjacent inner lamination of the skin locally thereof, wherein said outer lamination is undivided, and wherein said inner lamination, where the parting agent is interposed together with corresponding parts of any further inner laminations moulded thereto, is divided from the remainder thereof.

4. A method of producing an article as claimed in claim 1 in which the parting agent is regenerated cellulose sheet.

5. A method of producing an article as claimed in claim 1 in which the parting agent is regenerated cellulose sheet with layers of glass fibre cloth interposed between it and the synthetic resinous material.

6. A method of producing an article as claimed in claim 1 in which the parting agent is applied by spraying.

7. A method for producing a shaped article comprising a core and a moulded skin of cured synthetic resinous material secured to the core by securing members extending into the core from within the skin, of which latter the outer surface is shaped to a high degree of accuracy, according to which a first skin layer of synthetic resinous material is placed upon the core, there are then applied to said first skin layer first a parting material and subsequently a second skin layer of synthetic resinous material, the first and second skin layers are then simultaneously moulded and cured, the second skin layer is displaced from the first skin layer, securing members are inserted through the first skin layer into the core, and, the second skin layer is adhered to the first skin layer.

8. A method for producing a shaped article comprising a core and a moulded skin of cured synthetic resinous material secured to the core by securing members extending into the core from within the skin of which latter the outer surface is shaped to a high degree of accuracy, according to which a first skin layer of synthetic resinous material is placed upon the core, there are then applied to said first skin layer first a parting material locally thereof and subsequently a second skin layer of synthetic resinous material covering the first skin layer, the first and second skin layers are then simultaneously moulded and cured, the second skin layer is displaced from the first skin layer where the parting material is applied, securing members are inserted through the first skin layer where the second skin layer is displaced from it into the core and, the second skin layer is adhered to the first skin layer.

JAMES E. GORDON.
CYRIL G. EVANS.

References Cited in the file of this patent

UNITED STATES PATENTS

| Number | Name | Date |
|---|---|---|
| 1,980,022 | Whitehouse | Nov. 6, 1934 |
| 2,070,023 | Olsen | Feb. 9, 1937 |
| 2,310,619 | Dillehay | Feb. 9, 1943 |
| 2,431,720 | Willey | Dec. 2, 1947 |

FOREIGN PATENTS

| Number | Country | Date |
|---|---|---|
| 271,192 | Great Britain | May 26, 1927 |